United States Patent

Maass

(10) Patent No.: US 8,751,080 B2
(45) Date of Patent: Jun. 10, 2014

(54) METHOD AND DEVICE FOR OPERATING A DRIVE TRAIN FOR A VEHICLE

(75) Inventor: Alexander Maass, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 13/133,017

(22) PCT Filed: Nov. 25, 2009

(86) PCT No.: PCT/EP2009/065826
§ 371 (c)(1),
(2), (4) Date: Aug. 11, 2011

(87) PCT Pub. No.: WO2010/066582
PCT Pub. Date: Jun. 17, 2010

(65) Prior Publication Data
US 2011/0288709 A1   Nov. 24, 2011

(30) Foreign Application Priority Data
Dec. 10, 2008 (DE) .......... 10 2008 054 451

(51) Int. Cl.
*B60W 20/00* (2006.01)
(52) U.S. Cl.
USPC .............................. 701/22; 701/102; 701/110
(58) Field of Classification Search
USPC .......... 701/101–105, 110, 115, 22; 180/65.21–65.285; 477/3, 4, 5
See application file for complete search history.

(56) References Cited

U.S. PATENT DOCUMENTS

| | | |
|---|---|---|
| 5,959,420 A | 9/1999 | Boberg et al. |
| 6,825,575 B1 | 11/2004 | Edelson |
| 7,295,915 B1 * | 11/2007 | Okubo et al. ............ 701/110 |
| 7,836,986 B1 * | 11/2010 | Gillecriosd ............ 180/65.21 |
| 2009/0090572 A1 | 4/2009 | Huber et al. |

FOREIGN PATENT DOCUMENTS

| | | |
|---|---|---|
| DE | 4437322 | 5/1995 |
| DE | 19802480 | 8/1999 |
| DE | 102005060858 | 6/2007 |
| EP | 0754588 | 1/1997 |

OTHER PUBLICATIONS

International Search Report, PCT International Patent Application No. PCT/2009/065826, Dated Feb. 23, 2010.

* cited by examiner

*Primary Examiner* — Richard Camby
(74) *Attorney, Agent, or Firm* — Kenyon & Kenyon LLP

(57) ABSTRACT

A method and a device for operating a drive train for a vehicle is described, which has at least one drive unit, which is suitable for outputting a drive torque. The rates of change for triggering a torque increase and a torque reduction of the drive torque of the at least one drive unit are specified. This occurs in such a way that the specifiable rates of change of the torque increase and the torque reduction of the drive torque of the at least one drive unit are different.

10 Claims, 2 Drawing Sheets

US 8,751,080 B2

METHOD AND DEVICE FOR OPERATING A DRIVE TRAIN FOR A VEHICLE

FIELD OF THE INVENTION

The present invention relates to a method for operating a drive train for a vehicle, this drive train having at least one drive unit, which is suitable for outputting a drive torque.

BACKGROUND INFORMATION

German Patent Application No. DE 10 2005 060 858 describes a method for operating a vehicle, in which an actual torque of a drive unit is influenced by a reference shaper. Sudden changes in load or switching operations may induce a jerking of the vehicle, in which the rotating engine mass and the rotating transmission mass typically oscillate with respect to the reduced vehicle mass. Other forms of oscillation are also possible. Conventional methods for reducing jerking oscillations are based on avoiding the excitation of the drive train by sudden changes in load. For this purpose, the torque requested by the driver via the accelerator pedal is low-pass filtered with the aid of reference shapers in the event of sudden changes or its rate of change is limited. This slows down the increase or reduction of torque. In addition, measures are taken at the time of zero crossing of the drive torque, for example when transitioning from coasting to traction mode. The associated zero crossing of the reaction torque generates a tilt of the engine-transmission unit in its support. In addition, mechanical tolerances and inaccuracies in the drive train are run through. For reasons of comfort, this transition should take place "softly," which is achieved by limiting the gradient of the drive torque during its zero crossing. This is also the function of the reference shaper.

Conventionally, a rapid change in the torque of the electric machine requires a rapid change in the current; such rapid changes may shorten the service life of the electrical power source (battery). A very rapid drop in the torque of the internal combustion engine places a high heat load on the catalytic converter. At a low torque, the internal combustion engine works inefficiently. It is therefore advantageous either to operate the internal combustion engine at a high torque and to brake it using the electric machine as a generator, while current is being generated, or to shut off the internal combustion engine completely. The transition between these states is a situation in which the torque must be redistributed between the electric machine and the internal combustion engine.

SUMMARY

An example method according to the present invention and the example device for operating a drive train for a vehicle, which has at least one drive unit, which is suitable for outputting a drive torque, rates of change for triggering a torque increase and a reduction of the drive torque of the at least one drive unit being specifiable, specifies the specifiable rates of change in such a way that the rates of change of the torque increase and of the torque reduction of the drive torque of the at least one drive unit are different. The technical background of the method and the device according to the present invention is that, in addition to possibly many other parameters, which are known for determining rates of change of an increase in torque and in a reduction in torque it is additionally taken into account whether the change in torque is an increase or a reduction. Negative effects which occur due to inadequate adapted rates of change may thus be advantageously avoided. For example, if a drive unit is an electric machine, load peaks are prevented and thus the ageing of the battery is reduced by limiting the rate of change in the case of a torque increase of the electric machine. In the event of a torque reduction with the aid of an electric machine, a higher rate of change may be allowed. For example, if the drive unit is an internal combustion engine, thermal loads on the exhaust gas treatment system are minimized by limiting the rate of change in the case of torque reductions. In contrast, higher rates of change in the case of torque increases are advantageous if an internal combustion engine is thereby brought to a more advantageous operating point at which its efficiency is higher. It is therefore advantageous if different rates of change are specifiable, in principle, for torque increases and for torque reductions.

One refinement of the present invention provides that the drive train is designed as a drive train for a hybrid vehicle. Drive train is understood as the cooperation of the drive units and all driving wheels which contribute to driving the vehicle. Multiple drive units may act upon the same driving wheels together (for example, parallel/series/torque split hybrid) or different drive units may act upon different driving wheels (for example, drive of the front axle with the aid of the internal combustion engine, drive of the rear axle with the aid of the electric machine). The technical background of this refinement is that in the case of a drive train for a hybrid vehicle at least two, possibly different drive units are present, such as, for example, an internal combustion engine, an electric machine, a hydraulic motor, or also other drive units. Further degrees of freedom in specifying the different rates of change for torque increase and torque reduction are advantageous in this refinement of the present invention. By at least two drive units outputting a total drive torque for the hybrid vehicle, it being possible to add the drive torques of the individual drive units, it is possible that even highly different limitations of the rates of change of the individual drive units have no direct effect on the driving response of the vehicle. Advantage is taken of the fact that the total drive torque of the vehicle is composed of the instantaneous drive torques of the individual drive units. It is thus made possible that further criteria in specifying the rates of change for the torque increase or torque reduction may be taken into account, for example component ageing, system damage, environmental impacts, fuel consumption, thermal loads, and/or other aspects. Despite these criteria being taken into account, there is no direct, in particular perceptible, change in the driving response of the vehicle.

One refinement of the present invention is characterized in that the drive train has multiple drive units, which are suitable for outputting a drive torque, a total drive torque resulting from the sum of the drive torques of the individual drive units. Another refinement of the present invention is characterized in that the rates of change for triggering a torque increase and a torque reduction of the total drive torque of the individual drive units are specifiable, the specifiable rates of change of the torque increase and the torque reduction of the total drive torque of the individual drive units being different.

One refinement of the present invention is characterized in that at least one drive unit is designed as an electric machine. The technical background of this refinement is that the electric machine is a drive unit which may be regulated in a highly dynamic manner. An electric machine is capable of implementing a requested setpoint torque after a short response time. A rapid increase in the requested torque of an electric machine requires rapid change in the power made available in the vehicle's electrical system. In particular the service life of the electrical power source (battery) may be impaired thereby. A rapid reduction in the requested torque of an electric machine also requires a rapid change in the power made available in the vehicle's electrical system. This reduction, however, does not result in an impairment of the service life of the electrical power source in particular. Therefore, when using an electric machine as a drive unit, the rate of change of the torque increase is advantageously limited in comparison with the rate of change of the torque reduction.

Another refinement of the present invention is characterized in that the rates of change for a torque increase result as a function of predefined rates of change for a torque reduction or vice-versa. The technical background of this refinement of the present invention is that the rates of change for a torque reduction or torque increase depend on each other. It is therefore advantageously sufficient to store only one characteristic curve regarding the rate of change, for example, for torque reduction, since the rates of change for the torque increase may also be derived therefrom.

One refinement of the present invention provides that the rates of change for a torque increase result as a function of the rates of change for a torque reduction by multiplication of the rates of change for a torque reduction by a factor not equal to 1 or vice-versa. The technical background of this refinement of the present invention is that, for example, the rate of change of the torque reduction may be ascertained with the aid of a simple mathematical calculation from the rate of change of the torque increase. This calculation may be advantageously implemented in a resource-saving manner with the aid of a control unit.

In another refinement of the present invention it is provided that the rates of change of the drive torque of the drive unit are specified with the aid of at least one characteristic curve. The technical background of this refinement of the present invention is that a characteristic curve is stored in a control unit and the rates of change for the increase or reduction of the drive torques are determined as a function of this characteristic curve. This characteristic curve may be advantageously stored in a control unit and read in a resource-saving manner.

The present invention allows for numerous specific embodiments, some of which are to be explained in greater detail with reference to the figures.

DETAILED DESCRIPTION OF EXAMPLE EMBODIMENTS

Figure 1:
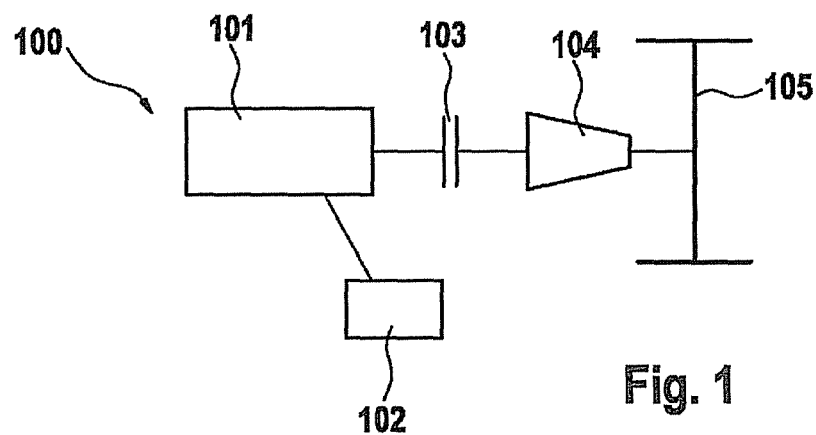
FIG. 1 shows a schematic diagram of a drive train of a vehicle.

FIG. 1 shows a drive train 100 for a vehicle. It has a drive unit 101, in particular an internal combustion engine, an electric machine, or a hydraulic motor, which is connected to drive axle 105 and the driving wheels via a separating clutch 103 and a downstream transmission 104. At least one control unit 102, is provided, which exchanges data with components of the drive train, in particular with the drive unit, the clutch and/or the transmission, and triggers at least one of these components, in particular specifies the rates of change for triggering a torque increase and/or a torque reduction of the drive torque of the drive unit (101, 301, 307).

Figure 2:
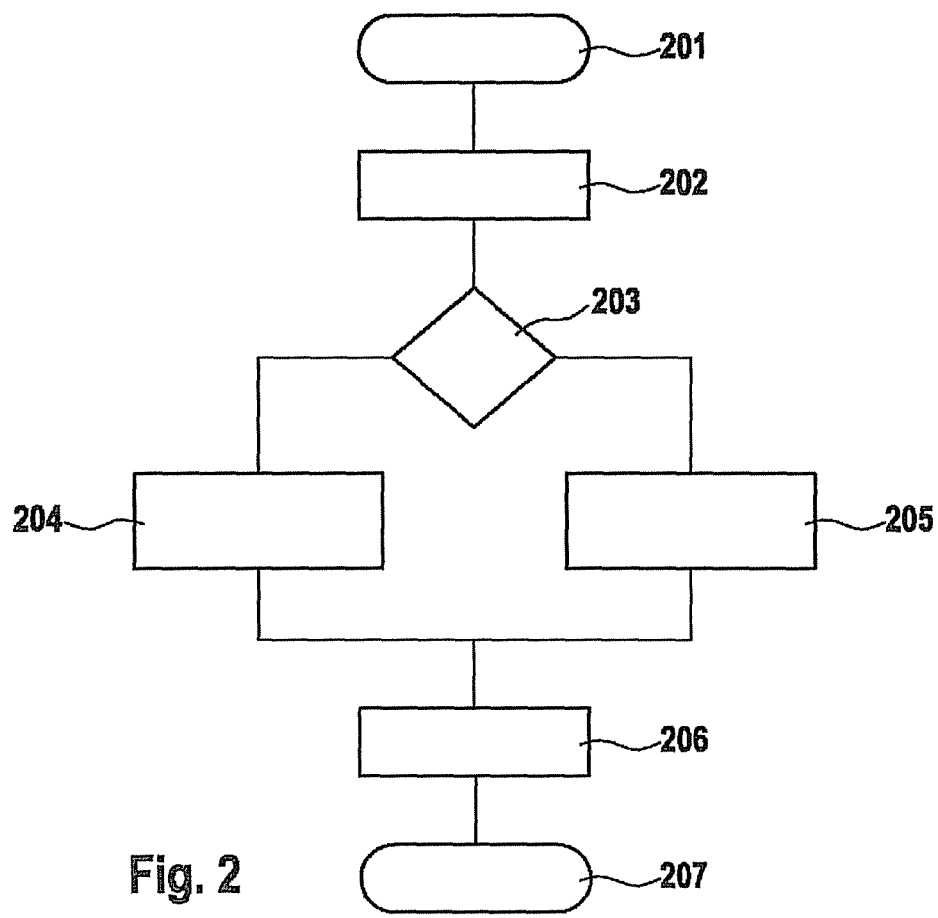
FIG. 2 shows a schematic flow chart of one exemplary embodiment of the method according to the present invention for operating a drive train.

FIG. 2 shows a schematic flow chart of an exemplary embodiment of the method according to the present invention for operating a drive train for a vehicle. The method starts with step 201. In step 202 the instantaneous and requested drive torques are read. Depending on whether the requested drive torque requires a torque reduction or a torque increase, a decision is made in step 203 as to whether the method is further executed in step 204 for determining a rate of change for a torque reduction or in step 205 for determining a rate of change for a torque increase. In step 204 the rate of change for the subsequent torque reduction is determined. This takes place, in particular, as a function of the instantaneous drive torque and/or the absolute value of the requested torque reduction. In step 206 the torque reduction is carried out according to the determined rate of change. The method is terminated in step 207. Alternatively, if a torque increase is required, the rate of change for the torque increase is determined in step 205. This takes place, in particular as a function of the instantaneous drive torque and/or the absolute value of the requested torque increase. The appropriate torque increase is carried out in step 206 at the determined rate of change for the torque increase. In this method, the absolute value of the rate of change which is determined in steps 204 and 205, in particular calculated or ascertained on the basis of at least one characteristic curve, differs due to the different dependencies for torque reduction and torque increase. The method is performed repeatedly during the operation of the drive train.

Figure 3:
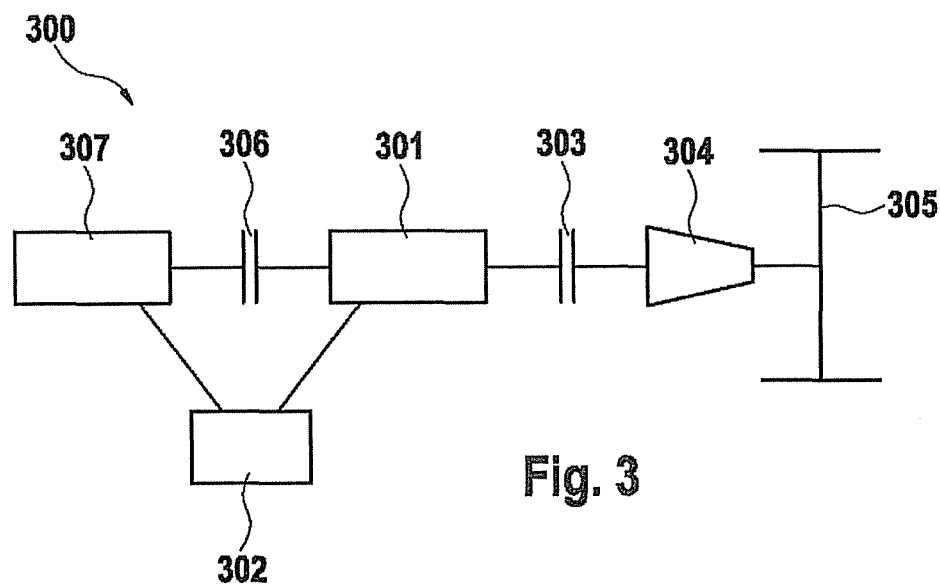
FIG. 3 shows a schematic diagram of a drive train for a hybrid vehicle.

FIG. 3 shows a schematic diagram of a drive train 300 for a hybrid vehicle. The two drive units 307 and 301, in particular an internal combustion engine, an electric machine or a hydraulic motor, are mechanically linkable with the aid of separating clutch 306. With the aid of separating clutch 303, the two drive units 307 and 301 are linked to drive axle 305 and the driving wheels via a transmission 304. The at least one control unit 302, exchanges data with the components of the drive train, in particular with the drive units, the clutches, or the transmission, and activates components of the drive train, in particular the drive units, the clutch, or the transmission. In particular, it specifies the rates of change for triggering a torque increase and/or a torque reduction of the drive torque of the drive unit (101, 301, 307).

Figure 4:
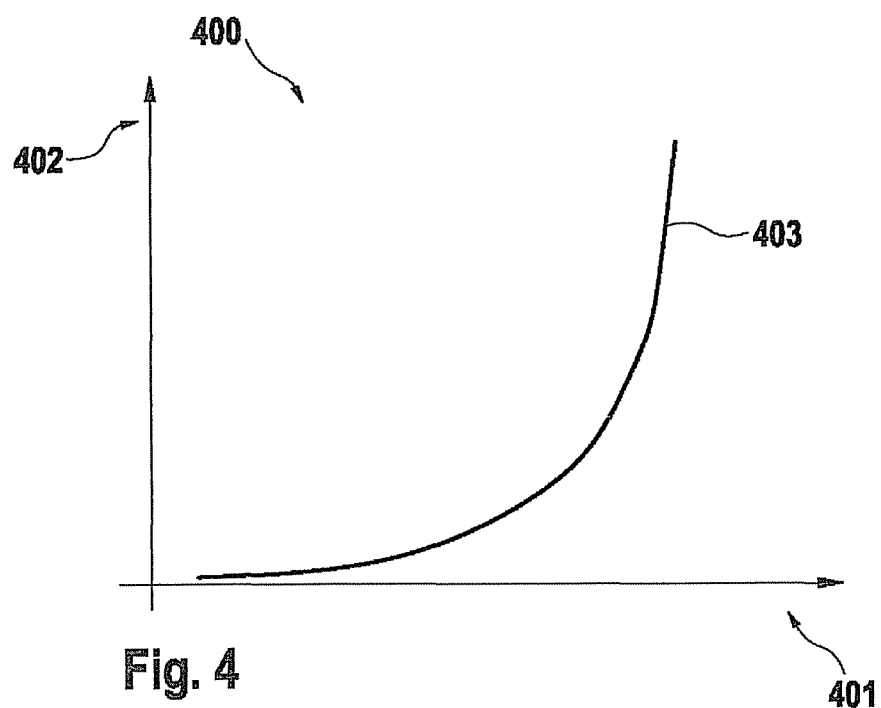
FIG. 4 shows a schematic diagram of a characteristic curve of a rate of change for a torque reduction or torque increase.

FIG. 4 shows a schematic characteristic curve diagram 400. The instantaneous drive torque is plotted on axis 401. The absolute value of the rate of change of the torque reduction or torque increase is plotted on axis 402. The rate of change, for example for torque increases, predefined at the currently existing drive torque, may also be read from characteristic curve 403. The rates of change for torque reduction are ascertained as a function of this characteristic curve. This is done in particular by multiplying the values of the rate of change read from the characteristic curve by a factor different from zero. Similarly, it is possible to store the characteristic curve for the torque reductions and to ascertain the rates of change for the torque increase therefrom. If the rates of change for torque reductions do not correlate with the rates of change for torque increases, a separate characteristic curve for both rates of change may be stored. Alternatively, the rates of change for torque increases and torque reductions may be ascertained from a single characteristic curve.

If the torque is redistributed, for example between the electric machine and the internal combustion engine, two alternatives may be considered: If a torque reduction of the electric machine is requested, the requested torque distribution to the drive units is achieved earlier with the aid of a rapid rate of change. However, in this case a higher load is placed on the battery, the internal combustion engine delivers a higher drive torque, and thus works more efficiently. A more rapid rate of change thus has an advantageous effect for quickly reaching the requested torque distribution to the drive units and for the more efficient operation of the internal combustion engine. The disadvantage is the higher load on the battery. In particular, a rapid rate of change is therefore an optimum compromise. If a torque increase of the electric machine is requested, the requested torque distribution to the drive units is achieved earlier with the aid of a rapid rate of change. In this case, a higher load is placed on the battery, the internal combustion engine delivers a lower drive torque, and thus works less efficiently. A more rapid rate of change thus has a disadvantageous effect on the load of the battery and regarding the less efficient operation of the internal combustion engine. The only advantage is the rapid achievement of the requested torque distribution. In particular, a slow rate of change is therefore an optimum compromise. According to the difference between the two examples, it makes sense to implement the change for reaching the requested drive torque at different rates.

Also in the case of sudden changes in torque spontaneously requested by ESP functions and/or automatic transmissions, different settings for the rates of change are advantageous. If an ESP intervention and/or a gear shift require a lower torque spontaneously and for a short time, this may be set, for example, using an internal combustion engine (impairs the efficiency short-term) or using the electric machine (places a marginal load on the battery). Both alternatives are disadvantageous. A decision may be made either by prioritizing, or the sudden change in torque may be distributed between the internal combustion engine and the electric machine. However, if an ESP intervention and/or a gear shift require a higher torque spontaneously and for a short time, the requested drive torque may be delivered using the internal combustion engine. Advantageously, the internal combustion engine works more efficiently and the battery is preserved. Prioritizing is unnecessary, since this mode of operation has no disadvantages. Therefore, for each sudden torque increase it is advantageous to perform the redistribution with the aid of the internal combustion engine.

These are simple forms of implementation in addition to many other possible forms. In addition, the exact efficiency characteristics map of the internal combustion engine and/or the battery-damaging effect of different rates and/or amplitudes of change may be taken into account for a decision.

The torque reductions of an electric machine are predefined via the characteristic curve, for example, as a function of the requested drive torque. For example, in the event of a drive torque of approximately 0 Nm requested by the driver, a maximum rate of change of the torque reduction by 3 Nm is allowed per calculation grid; for a drive torque of 200 Nm requested by the driver, however, it allows 10 Nm per calculation grid. For torque increases, the initial value of the characteristic curve is multiplied by a factor (selectable between 0 and 1). For example, the drive torque of an electric machine to be currently set is mathematically limited to:

Lower limit: (Drive torque of the electric machine in the latest calculation grid) minus (initial value of the characteristic curve)

Upper limit: (Drive torque of the electric machine in the latest calculation grid) plus (initial value of the characteristic curve multiplied by a factor).

What is claimed is:

1. A method for operating a drive train for a vehicle, which has at least one drive unit suitable for outputting a drive torque, the method comprising:
specifying rates of change for triggering a torque increase and a torque reduction of the drive torque of the at least one drive unit, wherein the rates of change are specified in such a way that the rates of change of the torque increase and of the torque reduction of the drive torque of the at least one drive unit are different.

2. The method as recited in claim 1, wherein the drive train is designed as a drive train for a hybrid vehicle.

3. The method as recited in claim 1, wherein the drive train has multiple drive units which are suitable for outputting a drive torque, a total drive torque resulting from a sum of the drive torques of the individual drive units.

4. The method as recited in claim 3, wherein the rates of change for triggering a torque increase and a torque reduction of the total drive torque of the individual drive units are specifiable, the specifiable rates of change of the torque increase and the torque reduction of the total drive torque of the individual drive units being different.

5. The method as recited in claim 1, wherein at least one drive unit is an electric machine.

6. The method as recited in claim 1, wherein the rates of change for a torque increase result as a function of predefined rates of change for a torque reduction.

7. The method as recited in claim 1, wherein the predefined rates of change for a torque reduction result as a function of the rates of change for a torque increase.

8. The method as recited in claim 6, wherein the rates of change for a torque increase result as a function of the rates of change for a torque reduction by multiplication of the rates of change for a torque reduction by a factor not equal to 1.

9. The method as recited in claim 1, wherein the rates of change of the drive torque of the drive unit are predefined with the aid of at least one characteristic curve.

10. A device for operating a drive train for a vehicle which has at least one drive unit suitable for outputting a drive torque, the device comprising:
at least one controller configured to specify rates of change for triggering a torque increase and a torque reduction of the drive torque of the drive unit, the specifiable rates of change being specified in such a way that the rates of change of the torque increase and of the torque reduction of the drive torque of the at least one drive unit are different.

* * * * *